Patented Dec. 6, 1949

2,490,393

UNITED STATES PATENT OFFICE 2,490,393

HYDROPYRANYL DERIVATIVES OF HEXA-HYDROPYRIMIDINES AND IMIDAZOLI-DINES

Richard R. Whetstone, Berkeley, and Seaver A. Ballard, Orinda, Calif., assignors to Shell Development Company, San Francisco, Calif., a corporation of Delaware No Drawing. Application January 12, 1948, Serial No. 1,888

17 Claims. (Cl. 260—251)

This invention relates to certain novel and useful hydropyranyl derivatives of hexahydropyrimidines and imidazolidines and to a method for their preparation. More particularly, the present invention relates to certain novel heterocyclic compounds containing a hydropyranyl ring directly attached by a bond between saturated carbon atoms to a nitrogen-containing heterocyclic ring, and to a method for their preparation.

It has been discovered in accordance with the invention that hydropyrancarboxaldehydes wherein the formyl group is directly attached to a saturated carbon atom may be caused to react as hereinafter described with diamines in which the two amino nitrogen atoms are separated by from two to three carbon atoms, to form valuable heterocyclic compounds wherein a hydropyran ring is directly attached to a heterocyclic ring composed of atoms of carbon and two atoms of nitrogen. These novel compounds, and an especially advantageous method for their preparation, form the subject of the generic aspects of the present invention.

The compounds provided by the present invention have been found to possess unusual and highly desirable characteristics. Their valuable properties are due in part to the particular character of the heterocyclic rings which are contained in their structure as an essential feature thereof, and in a further part to the particular manner of attachment and the configuration of the two heterocyclic rings relative to one another and the particular positions of the non-carbon atoms in the heterocyclic rings and in the molecule as a whole.

The compounds to which the present invention relates in its generic concepts may be defined by reference to the structural formula:

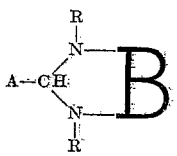

in which A represents a hydropyranyl ring group directly attached to the carbon atom at a saturated carbon atom in the hydropyranyl ring, B represents a divalent aliphatic saturated hydrocarbon group attached to the respective amino nitrogen atoms by univalent bonds which are separated by from 2 to 3 carbon atoms of the hydrocarbon group, and R represents an atom of hydrogen or a hydrocarbon group. When we refer to a hydropyranyl group, we intend to refer exclusively to those groups which contain the partially or the completely hydrogenated pyranyl ring, which ring, as aforementioned, is directly attached to the carbon atom in the above formula at a saturated carbon atom.

Representative hydropyranyl groups which may be represented by A in accordance with the generic aspects of the invention include, for example, the 2-(3,4-dihydro-1,2-pyranyl) group, the 2-tetrahydropyranyl group, the 3-tetrahydropyranyl group, the 2-(2,5-dimethyltetrahydropyranyl) group, the 2-(2,5-dimethyl-3,4-dihydro-1,2-pyranyl) grup, the 2-(5-chloro-3,4-dihydro-1,2-pyranyl) group, the 4-tetrahydropyranyl group, the 2-(2,5-diethyl-3,4-dihydro-1,2-pyranyl) group, the 2-(5-methyl-3,4-dihydro-1,2-pyranyl) group, the 2-(2,5-diisopropyltetrahydropyranyl) group, the 3-(2,6-dimethyltetrahydropyranyl) group, and homologous and analogous groups. It will be observed that the hydropyranyl group may be the unsubstituted di- or tetrahydropyranyl group, or that one or more of the hydrogen atoms thereof may have been replaced by hydrocarbon groups or other substituents. However, it is essential in accordance with the invention that the hydropyranyl group contain not more than one carbon-to-carbon multiple bond in the hydropyranyl ring, and that the hydropyranyl ring be directly attached to the carbon atoms of the above formula at a saturated carbon atom, i. e., a carbon atom that is bonded by univalent bonds to four atoms.

In accordance with a preferred embodiment of the invention, the hydropyran group represented by A in the above generic formula is the 2-(3,4-dihydro-1,2-pyranyl) group or a substituted 2-(3,4-dihydro-1,2-pyranyl) group. It has been discovered that the compounds within this preferred group possess especially noteworthy and desirable characteristics that render them of particular value and distinction within the broader aspects of the invention. These desirable characteristics of the preferred compounds are believed to be due to the unique structure of the compounds. The unique structure of the preferred compounds of the invention is characterized in part by the attachment together of the two heterocyclic rings by a bond between saturated carbon atoms each of which is attached directly to a non-carbon atom in its respective ring. The unique structure of the preferred compounds is further characterized in part by the presence of a carbon-to-carbon double bond in the 5,6-position of the dihydropyranyl ring, and by the relative configuration of the thus unsaturated hydropyranyl ring and the second, nitrogen-containing heterocyclic ring. The distinctive structure of the preferred compounds of the invention has been found to impart particular usefulness in certain special applications. For example, they may be employed as insecticides or as agents to enhance the activity of known insecticides, as ingredients in the compounding or the preparation of pharmaceutical compositions or products, as chemical intermediates, as ingredients useful in the compounding or vulcanization of rubber, and as alkali-stable, acid sensitive organic bases which are useful in special applications.

It has been discovered in accordance with the present invention that the novel compounds to which the invention relates may be prepared with particular advantage by reacting dihydro- and tetrahydropyrancarboxaldehydes wherein the formyl group is directly attached to a saturated carbon atom with organic diamines wherein the two amino nitrogen atoms are separated by from 2 to 3 carbon atoms and each nitrogen atom is attached to at least one atom of hydrogen, in the absence of materials or conditions which would favor undesired side reactions, degradation, decomposition, condensation, polymerization, or like undesired reactions. The desired reaction is not dependent upon the presence of catalysts. In fact, it generally may be effected non-catalytically with eminently satisfactory results. The desired reaction may be favored advantageously by withdrawing from the reaction mixture water formed by the reaction at a rate substantially equal to the rate of its formation. This may be accomplished in a variety of ways. One particularly effective method comprises heating a mixture comprising the selected reactants to the boiling point, and continuously separating water from the evolved vapors prior to their return, as by reflux condensation, to the liquid reaction mixture. The separation of the water most conveniently may be accomplished by heating the reaction mixture in a reaction vessel equipped with a reflux distillation column having means for separating water from the vapors and/or the condensate. By maintaining a high total reflux, the water formed by the reaction may be removed substantially as soon as it is formed, the desired reaction thereby being favored and brought to completion within a reasonable and advantageously short period of time, generally not over about 6 hours. When no more water is evolved from the reaction mixture, i. e., when the reaction is for practical purposes complete, the reaction mixture remaining in the vessel may be treated in any suitable manner to recover the desired product. If the desired product is one that is readily distillable, the reaction mixture after completion of the reaction may be subjected to fractional distillation, e. g., under reduced pressure, in order to recover the product and, if desired, any of the reactants that may be present in unreacted form. In place of fractional distillation, or in conjunction therewith, other known methods may be employed to recover and/or to purify the desired product. For example, the less volatile compounds provided by the invention may be recovered by dissolving the reaction mixture after completion of the reaction in a solvent and precipitating the product by addition of a non-solvent to the solution. Fractional crystallization, as from solution, sublimation, extraction with selective solvents, adsorption, etc., all are suitable methods which may be employed in appropriate cases to recover the novel compounds from the reaction mixture and/or to further purify them.

Although the foregoing procedure is widely applicable to the preparation of the novel products to which the invention is directed, suitable modifications therein may be made as desired or as required by the nature of the specific reactants that are employed. For example, it may be desired to include in the reaction mixture a suitable inert solvent, i. e., an organic solvent that is inert both to the reactants and to the products of the reaction. Suitable solvents include, for example, ethers, esters, hydrocarbons, heterocyclic oxygen-containing solvents, e. g., dioxane, and the like. By regulating the amount and the kind of the solvent, the reflux temperature of the reaction mixture may be controlled conveniently. Temperatures of from about 40° C. to about 200° C., preferably from about 75° C. to about 150° C., may be employed. If the solvent is one which forms an azeotrope with water, the azeotropic mixture may be separated from the reaction mixture and the solvent subsequently recovered. Additional amounts of the solvent may be added to the reaction mixture either intermittently or continuously to replace the solvent removed in the evolved vapors or the azeotropic mixture.

The water, or the azeotropic mixture containing the water, may be separated from the total vapors evolved from the reaction mixture in any suitable manner, including fractional condensation, total condensation followed by stratification, extraction, salting out, treatment with drying agents, or the like.

The novel products to which the invention pertains may be prepared by either a continuous, an intermittent, or a batchwise type of process. Addition of the reactants to the reaction mixture may be made in one or a plurality of zones and the water formed by the reaction may be completely removed as it is formed, in one separating means, or a plurality of separating means may be employed with partial separation in each. Ordinarily there will be employed only the single pair of reactants that is required in any given instance to prepare the particular product that is desired. However, more than one hydropyrancarboxaldehyde and/or more than one diamine may be employed, if desired, to prepare a plurality of products of the present character in a single reaction mixture. It ordinarily is highly effective to heat the reaction mixture containing the hydropyran carboxaldehyde and the diamine to its boiling point, say from 40° C. to 200° C., under the atmospheric pressure. If desired, pressures above or below the atmospheric pressure may be employed to raise or lower, respectively, the boiling point from the boiling temperature at atmospheric pressure.

The reaction which is believed to be effected in accordance with the process of the invention may be illustrated conveniently by the equation which represents the manner in which certain of the preferred compounds are formed in the process, as follows:

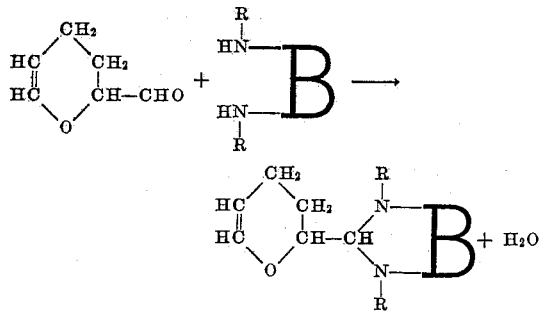

In this equation, B and R have their hereinbefore defined significance. The hydropyrancarboxaldehyde is illustrated by the preferred specific member of the class, that is, by 3,4-dihydro-1,2-pyran-2-carboxaldehyde. In place of 3,4-dihydro-1,2-pyran-2-carboxaldehyde, other dihydro- and tetrahydro-pyran carboxaldehydes wherein the formyl group is attached to a saturated carbon atom may be employed to prepare in a similar manner compounds included in the preferred or generic aspects of the invention.

Organic diamines wherein each amino nitrogen atom is attached to at least one atom of hydrogen and the two nitrogen atoms are separated by from 2 to 3 carbon atoms, may be reacted with hydropyrancarboxaldehydes of the hereindefined character to provide numerous useful and valuable compounds within the scope of the invention. One especially valuable group of compounds may be prepared by reacting 3,4-dihydro-1,2-pyran-2-carboxaldehyde or a lower alkyl substitution product thereof containing up to two lower alkyl substituent groups, with completely aliphatic diamines wherein the nitrogen atoms are separated by three carbon atoms. The diamines may contain from 3 up to 30 or even more carbon atoms, and preferably may contain from 3 to 18 carbon atoms. Preferably both nitrogen atoms of the diamines are primary amino nitrogen atoms, i. e., the amino groups are —NH₂ groups. The products which may be prepared according to this embodiment of the invention may be referred to as 2-[2-(3,4-dihydro-1,2-pyranyl)]-hexahydropyrimidines, and may be illustrated more particularly in a preferred embodiment by reference to the formula

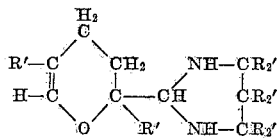

in which each R' represents a hydrogen atom or an alkyl group. Illustrative compounds represented by the above formula include, among others, 2-[2-(3,4-dihydro-1,2-pyranyl)]-hexahydropyrimidine
2-[2-(3,4-dihydro-1,2-pyranyl)]-4-methylhexahydropyrimidine
2-[2-(3,4-dihydro-1,2-pyranyl)]-4,6-dimethylhexahydropyrimidine
2-[2-(3,4-dihydro-1,2-pyranyl)]-4,4,5,6-tetramethylhexahydropyrimidine
2-[2-(3,4-dihydro-1,2-pyranyl)]-4,6-diethylhexahydropyrimidine
2-[2-(3,4-dihydro-1,2-pyranyl)]-4,5-dibutylhexahydropyrimidine
2-[2-(3,4-dihydro-1,2-pyranyl)]-4-hexyl-5-methyl-6-pentylhexahydropyrimidine
2-[2-(3,4-dihydro-1,2-pyranyl)]-4-octylhexahydropyrimidine
2-[2-(3,4-dihydro-1,2-pyranyl)]-4,6-dioctylhexahydropyrimidine
2-[2-(2,5-dimethyl-3,4-dihydro-1,2-pyranyl)]-hexahydropyrimidine
2-[2-(2,5-diethyl-3,4-dihydro-1,2-pyranyl)]-4,4,6-triethylhexahydropyrimidine
2-[2-(2-methyl-3,4-dihydro-1,2-pyranyl)]-4,4,6-triethylhexahydropyrimidine
2-[2-(2-methyl-3,4-dihydro-1,2-pyranyl)]-4-isopropylhexahydropyrimidine The 2-[2-(3,4-dihydro-1,2-pyranyl)]-hexahydropyrimidines which contain a plurality of alkyl groups attached to carbon atoms of the hexahydropyrimidine ring, e. g., in one or more of the 4,5 and 6 positions thereof, as the sole substituents in the ring and which contain a total of at least 11 and preferably from 12 to about 36 carbon atoms, are especially valuable. They may be prepared according to the process of the invention by reacting 3,4-dihydro-1,2-pyran-2-carboxaldehyde or a lower alkyl substitution product thereof with a suitable aliphatic diamine wherein the nitrogen atoms are separated by three carbon atoms and at least two of these three carbon atoms are attached to one or more additional atoms of carbon, such as, for example, 2,4-pentadiamine, 2,4-hexanediamine, 3-methyl-2,4-hexanediamine, 3-methyl-2,4-hexanediamine, 3,4,5-trimethyl-2,4-hexanediamine, and homologs and analogs thereof. The novel bicyclic heterocyclic compounds which thus may be prepared possess, because of their unusual and characteristic structure, particular value as complex organic bases which may be employed in special applications.

When 3,4-dihydro-1,2-pyran-2-carboxaldehyde or an alkyl-substituted 3,4-dihydro-1,2-pyran-2-carboxaldehyde is caused to react in accordance with the process of the invention with aliphatic diamines in which the nitrogen atoms are separated by two carbon atoms, there may be obtained a further valuable group of compounds which contain a hydropyranyl group attached by a univalent bond between saturated carbon atoms to the carbon atom in position No. 2 of an imidazolidine ring. A preferred group of compounds which may be prepared in this manner may be illustrated by the reference to the structural formula

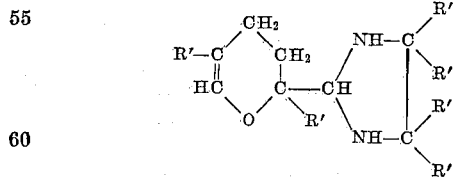

in which R' has its above defined significance. Representative 2-[2-(3,4-dihydro-1,2-pyranyl)]-imidazolidines having structures corresponding to the foregoing formula, include, among others, 2-[2-(3,4-dihydro-1,2-pyranyl)]-imidazolidine
2-[2-(3,4-dihydro-1,2-pyranyl)]-4-methyl-imidazolidine
2-[2-(2,5-dimethyl-3,4-dihydro-1,2-pyranyl)]-imidazolidine
2-[2-(2-methyl-3,4-dihydro-1,2-pyranyl)]-4,5-diethylimidazolidine
2-[2-(3,4-dihydro-1,2-pyranyl)]-4-butylimidazolidine 2-[2-(3,4-dihydro-1,2-pyranyl)]-4,5-diisopropyl-
imidazolidine
2-[2-(2,5-dimethyl-3,4-dihydro - 1,2 - pyranyl)]-
4,5-dihexylimidazolidine
2-[2-(2-methyl-3,4-dihydro - 1,2 - pyranyl)]-4-
octylimidazolidine
2-[2-(3,4-dihydro-1,2-pyranyl)] - 4 - neopentyl-
imidazolidine
2-[2-(2,5-dipropyl-3,4-dihydro-1,2-pyranyl)]-4-
isopropyl-5-hexylimidazolidine
2-[2-(3,4-dihydro-1,2-pyranyl)]-4,5-dioctylimid-
azolidine Further examples of specific aliphatic diamines and substituted aliphatic diamines which may be employed to prepare valuable and novel compounds according to the broadest concepts of the invention include, among others, the following:

1,2-diaminocyclohexane, 2-allyl-1,3-propane-diamine, N,N'-diethyl-1,3-propanediamine, 2-phenyl-1,3-dimethyl-1,3-propanediamine, 3,4-dimethyl-1,2-diamino-cyclopropane, 2-butenyl-3,4-diamine, 2-nitro-2-methyl-1,3-propanediamine, 5-chloro-1,3-pentanediamine, N,N'-diphenyl-1,3-propanediamine, 4-bromo-1,3-butanediamine, 5-chloro-2,4-pentanediamine, 3-amino-piperidine, and N-cyclohexyl-2,4-butanediamine.

The following examples will illustrate the preparation of certain of the compounds to which the invention relates. In the examples, the parts are by weight.

Example I

Sixty-seven parts of 3,4-dihydro-1,2-pyran-2-carboxaldehyde and one hundred and eleven parts of 2-methyl-2,4-pentanediamine were mixed with one hundred parts of benzene in a glass lined reaction vessel. The reaction vessel was equipped with a reflux column which had a phase separating head arranged for withdrawal of water from the column and return of non-aqueous phase to the reaction vessel. The mixture was heated to the boiling point and maintained at boiling with reflux and withdrawal of water until evolution of water ceased. The reaction mixture then was removed from the reaction vessel and fractionally distilled under reduced pressure. After separation of the benzene and a small amount of fore-run, a fraction distilling from 84° C. to 87° C. under a pressure of about 1.5 millimeters of mercury was separated. The fraction was identified as the essentially pure compound 2-[2-(3,4-dihydro-1,2-pyranyl)]-4,4,6-trimethylhexahydropyrimidine having a refractive index ($n_D^{20}$) of 1.4893, and a basicity (determined by titration to the end-point of methyl red indicator) of 0.486 equivalents per hundred grams compared to a calculated basicity of 0.476 equivalents per one hundred grams. The product was analyzed and found to contain 68.67% carbon, 10.63% hydrogen and 13.1% nitrogen compared to values of 68.63% carbon, 10.55% hydrogen, and 13.8% nitrogen calculated for the formula $C_{12}H_{22}ON_2$. The formula of the 2-[2-(3,4-dihydro-1,2-pyranyl)-4,4,6-trimethylhexahydropyrimidine may be represented as follows:

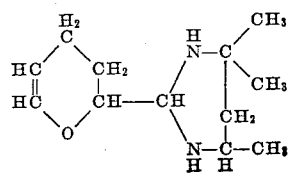

Example II 2-methyl-3,4-dihydro-1,2-pyran-2-carboxaldehyde and 1,3-hexanediamine are reacted in the presence of benzene according to the method of the preceding example. There is recovered in excellent yield by fractional distillation of the reaction mixture after evolution of water has ceased, 2-[2-(2-methyl-3,4-dihydro-1,2-pyranyl)]-4-propylhexahydropyrimidine having a structure which may be represented as follows

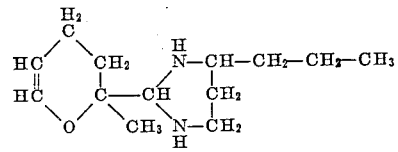

Example III 56 parts of 2,5-dimethyl-3,4-dihydro-1,2-pyran-2-carboxaldehyde and 61 parts of 2-methyl-2,4-pentanediamine were mixed with one hundred parts of benzene and the mixture was heated at reflux under a fractionating column as in Example I until evolution of water ceased. Upon fractional distillation of the resulting mixture, there was recovered in a yield of 92% of theory 2-[2-(2,5 - dimethyl - 3,4-dihydro-1,2-pyranyl)]-4,4,6-trimethylhexahydropyrimidine as a fraction distilling at 102.8° C. to 104° C. under a pressure of 3 millimeters of mercury and having a refractive index ($n_D^{20}$) of 1.4853 and having a basicity (determined by titration to the end point of methyl-red indicator) of 0.434 equivalents per hundred grams compared to a calculated basicity of 0.420 equivalents of per hundred grams. The indicated product was analyzed and found to contain 70.66% carbon, 10.98% hydrogen, and 11.7% nitrogen, compared to values of 70.53% carbon, 11.00% hydrogen, and 11.7% nitrogen, calculated for the formula $C_{14}H_{26}ON_2$. The structural formula of the 2 - [2 - (2,5 - dimethyl - 3,4-dihydro-1,2-pyranyl)]-4,4,6-trimethylhexahydropyrimidine may be represented as follows

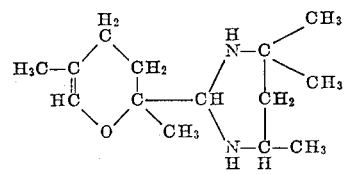

As illustrated in the foregoing examples, it is convenient to employ the two reactants in approximately equimolar amounts. Alternatively, one of the reactants may be employed in an excess over the amount theoretically required in the reaction. For example, molar ratios between the two reactants of from about 10:1 to 1:10 generally may be employed, a preferred range being from about 3:1 to 1:3. The use of an excess of one of the reactants may be desirable, for instance, when the other reactant is relatively more precious, maximum yields based upon the amount of the more precious reactant thereby being favored. After the reaction is completed, the unreacted excess of the reactant that is present in the greater amount may be recovered, as during fractional distillation, and reutilized, if desired in the preparation of a further amount of the desired product.

The preceding examples illustrate particularly the preparation of polyhydrocarbyl 2-(2-dihydro-pyranylpyrimidines) which are illustrative of the compounds provided by the present invention. The following examples further illustrate the invention and the preparation of certain dihydropyranyl imidazolidines and polyhydrocarbyl-(dihydropyranyl)imidazolidines to which the invention relates.

*Example IV*

A mixture of 67 parts of 3,4-dihydro-1,2-pyran-2-carboxaldehyde, 40 parts of ethylene diamine, and one hundred parts of benzene was heated according to the method of Example I at the reflux temperature with withdrawal of water until evolution of water ceased. The resultant mixture was fractionally distilled under reduced pressure. After separation of the benzene, 2-[2-(3,4-dihydro-1,2-pyranyl)]-imidazolidine was recovered as a fraction distilling at about 93° C. under a pressure of 3 millimeters of mercury, having a refractive index ($n_D^{20}$) of 1.5147 and a basicity (determined by titration with perchloric acid to the endpoint of crystal violet) of 1.30 compared to a theoretical basicity of 1.30. The product was analyzed and found to contain 61.93% carbon, 9.25% hydrogen and 18.3% nitrogen compared to values of 62.31% carbon, 9.16% hydrogen and 18.2% nitrogen calculated for the formula $C_8H_{14}ON_2$. The structural formula of the 2-[2-(3,4-dihydro-1,2-pyranyl)]-imidazolidine may be represented as follows

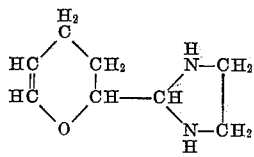

*Example V*

2,5-dimethyl-3,4-dihydro-1,2-pyran-2-carboxaldehyde and 1,2-hexanediamine are reacted according to the method of the preceding examples. There is recovered by fractional distillation of the reaction mixture 2-[2-(2,5-dimethyl-3,4-dihydro-1,2-pyranyl)]-4-butylimidazolidine having a structure that may be represented by the formula

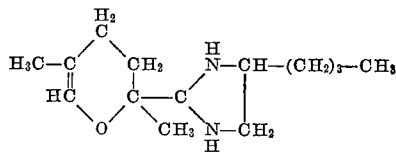

The preceding examples have illustrated particularly the preparation of compounds in the preferred group to which the invention relates i. e., to bicyclic heterocyclic compounds wherein a 2-(3,4-dihydro-1,2-pyranyl) group or a hydrocarbyl-substituted 2-(3,4-dihydro-1,2-pyranyl) group is attached by a univalent bond to the carbon atom in position number 2 of a hexahydropyrimidine or imidazolidine ring. As has been made evident in the examples, the compounds within this preferred group may be prepared conveniently by reacting according to the process of the invention 3,4-dihydro-1,2-pyran-2-carboxaldehyde or a suitable substitution product thereof with a diamine of the herein described character. Compounds within the generic concepts of the invention wherein the hydropyranyl group is other than the 2-(3,4-dihydro-1,2-pyranyl) group may be prepared in an analogous manner by suitably reacting other dihydropyran carboxaldehydes wherein the formyl group is directly attached to a saturated carbon atom, or tetrahydropyrancarboxaldehydes with diamines of the character described herein. The products which thus may be prepared may be employed as chemical intermediates, as materials that are useful as surface active agents, or as intermediates for the preparation of surface active agents, as solvents or plasticizers that are useful in special applications, and as biologically active compounds or precoursers of biologically active compounds. The members of the preferred group of compounds provided by the invention, because of their unique structure and the particular configuration of the non-carbon atoms and the double bond in the heterocyclic rings, are of particular value as new chemicals which are useful in the synthesis of derived products, and as specifically active biologically useful compounds.

This application concerns subject matter which is related to the subject matter of the copending application Serial No. 713,455 filed December 2, 1946, now Patent No. 2,479,283, by one of the present applicants. Reference also is made to the copending application Serial No. 735,029, filed March 15, 1947, now Patent No. 2,479,284, a continuation-in-part of the aforesaid application Serial No. 713,455.

We claim as our invention:

1. 2-[2-(3,4-dihydro-pyranyl)]-4,4,6-trimethylhexahydropyrimidine.

2. A 2-[2-(3,4-dihydro-1,2-pyranyl)]-polyalkylhexahydropyrimidine.

3. A 2-[2-(3,4-dihydro-1,2-pyranyl)]hexahydropyrimidine, the said dihydropyranyl group being the unsubstituted 2-(3,4-dihydro-1,2-pyranyl) group.

4. The process which comprises reacting 3,4-dihydro-1,2-pyran-2-carboxaldehyde with 2-methyl-2,4-pentanediamine at a reaction temperature between about 40° C. and about 200° C., withdrawing water from the reaction mixture substantially as rapidly as it is evolved, and recovering 2-[2-(3,4-dihydro-1,2-pyranyl)]-4,4,6-trimethylhexahydropyrimidine from the mixture.

5. The process which comprises reacting 3,4-dihydro-1,2-pyran-2-carboxaldehyde with an aliphatic diamine wherein the amino nitrogen atoms are separated by three carbon atoms at a reaction temperature of between about 40° C. and about 200° C., withdrawing water from the reaction mixture substantially as rapidly as it is evolved, and recovering a 2-[2-(3,4-dihydro-1,2-pyranyl)]hexahydropyrimidine from the mixture.

6. 2-[2-(2,5-dimethyl-3,4-dihydro-1,2-pyranyl)]-4,4,6-trimethylhexahydropyrimidine.

7. A 2-[2-(dimethyl-3,4-dihydro-1,2-pyranyl)] polyalkylhexahydropyrimidine.

8. A polyalkyl 2-[2-(3,4-dihydro-1,2-pyranyl)]-hexahydropyrimidine.

9. A 2-[2-(3,4-dihydro-1,2-pyranyl)]-hexahydropyrimidine.

10. The process which comprises reacting a 3,4-dihydro-1,2-pyran-2-carboxaldehyde with an aliphatic diamine wherein the amino nitrogen atoms are separated by three carbon atoms in the presence of an inert organic solvent at the boiling point of the mixture, withdrawing water from the reaction mixture, and recovering a 2-[2-(3,4-dihydro-1,2-pyranyl)]-hexahydropyrimidine from the mixture.

11. The process which comprises reacting 2,5-dimethyl-3,4-dihydro-1,2-pyran-2-carboxaldehyde with 2-methyl-2,4-pentanediamine at a reaction temperature between about 40° C. and about 200° C., withdrawing from the reaction mixture water formed by the reaction, and recovering 2-[2-(2,5-dimethyl-3,4-dihydro-1,2-pyranyl)]-4,4,6-trimethylhexahydropyrimidine from the mixture.

12. 2-[2-(3,4-dihydro - 1,2 - pyranyl)]-imidazolidine.

13. A 2-[3,4-dihydro - 1,2 - pyranyl)]-imidazolidine, said dihydropyranyl group being the unsubstituted 2-(3,4-dihydro-1,2-pyranyl) group.

14. A 2-[2-(3,4-dihydro-1,2-pyranyl)]-imidazolidine.

15. The process which comprises reacting 3,4-dihydro - 1,2-pyran - 2 - carboxaldehyde with ethylene diamine at a reaction temperature between about 40° C. and about 200° C., withdrawing from the reaction mixture water formed by the reaction, and recovering 2-[2-(3,4-dihydro-1,2-pyranyl)]-imidazolidine from the mixture.

16. A process which comprises reacting a hydropyran carboxaldehyde with a diamine wherein the amino groups are separated by from 2 to 3 carbon atoms at a reaction temperature between about 40° C. and about 200° C., and recovering from the mixture a compound having the formula

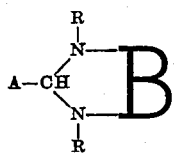

in which A represents a hydropyranyl group directly attached to the carbon atom at a saturated carbon atom in the hydropyranyl ring, B represents a divalent aliphatic saturated hydrocarbon group completing the heterocyclic ring in which the atoms of nitrogen are separated through said hydrocarbon groups by from 2 to 3 carbon atoms in direct linkage, and R represents one of the class consisting of the hydrogen atom and the hydrocarbon groups.

17. A compound having the formula

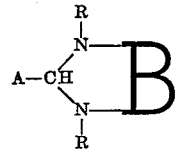

wherein A represents a hydropyranyl group directly attached to the carbon atom at a saturated carbon atom in the hydropyranyl ring, B represents a divalent aliphatic saturated hydrocarbon group completing the heterocyclic ring in which the atoms of nitrogen are separated through said hydrocarbon group by from 2 to 3 carbon atoms in direct linkage, and R represents one of the class consisting of the hydrogen atom and the hydrocarbon groups.

RICHARD R. WHETSTONE.
SEAVER A. BALLARD.

REFERENCES CITED

The following references are of record in the file of this patent:

UNITED STATES PATENTS

| Number | Name | Date |
|---|---|---|
| 2,264,894 | Shoemaker et al. | Dec. 2, 1941 |